(12) United States Patent
Hoshina et al.

(10) Patent No.: US 9,184,445 B2
(45) Date of Patent: Nov. 10, 2015

(54) NONAQUEOUS ELECTROLYTE BATTERY AND BATTERY PACK

(75) Inventors: Keigo Hoshina, Yokohama (JP); Hiroki Inagaki, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 70 days.

(21) Appl. No.: 13/234,452

(22) Filed: Sep. 16, 2011

(65) Prior Publication Data

US 2012/0225346 A1 Sep. 6, 2012

(30) Foreign Application Priority Data

Mar. 2, 2011 (JP) .................................. 2011-045427

(51) Int. Cl.
| | |
|---|---|
| *H01M 4/134* | (2010.01) |
| *H01M 4/38* | (2006.01) |
| *H01M 4/58* | (2010.01) |
| *H01M 4/485* | (2010.01) |
| *H01M 10/0569* | (2010.01) |

(52) U.S. Cl.
CPC ............ *H01M 4/5825* (2013.01); *H01M 4/485* (2013.01); *H01M 10/0569* (2013.01); *Y02E 60/122* (2013.01)

(58) Field of Classification Search
None
See application file for complete search history.

(56) References Cited

U.S. PATENT DOCUMENTS

2004/0234857 A1* 11/2004 Shiozaki et al. ............ 429/231.3
2005/0064282 A1* 3/2005 Inagaki et al. ................ 429/163

FOREIGN PATENT DOCUMENTS

| CN | 101093886 A | 12/2007 |
|---|---|---|
| CN | 101162789 A | 4/2008 |
| JP | 2005-158719 | 6/2005 |

OTHER PUBLICATIONS

TiO2(B) nanotubes as negative electrodes for rechargeable lithium batteries, Electrochemical and Solid-State Letters, 9 (3), A139-A143, 2006.*

Chinese Office Action issued Dec. 12, 2013, in China Patent Application No. 201110282355.0 (with English translation).

* cited by examiner

*Primary Examiner* — Cynthia K Walls
(74) *Attorney, Agent, or Firm* — Oblon, McClelland, Maier & Neustadt, L.L.P.

(57) ABSTRACT

According to one embodiment, a nonaqueous electrolyte battery is provided. The battery includes a positive electrode, a negative electrode, and a nonaqueous electrolyte. The positive electrode includes lithium iron phosphate having an olivine structure as positive electrode active material. The negative electrode includes lithium titanate having a spinel structure and a monoclinic β-type titanium complex oxide as a negative electrode active material.

15 Claims, 4 Drawing Sheets

NONAQUEOUS ELECTROLYTE BATTERY AND BATTERY PACK

CROSS-REFERENCE TO RELATED APPLICATIONS

This application is based upon and claims the benefit of priority from prior Japanese Patent Application No. 2011-045427, filed Mar. 2, 2011, the entire contents of which are incorporated herein by reference.

FIELD

Embodiments described herein relate generally to a nonaqueous electrolyte battery and a battery pack.

BACKGROUND

A nonaqueous electrolyte battery such as lithium ion secondary battery has been expected to have a high-energy density. Recently, the positive electrode active materials such as lithium manganate having a spinel structure, lithium iron phosphate having an olivine structure and the like have been developed. These positive electrode active materials are inexpensive and provide a high level of safety. Particularly, lithium iron phosphate having an olivine structure has a stable crystal structure and has a lithium ion-insertion/extraction potential as relatively low as about 3.4 V (vs. Li/Li+). Therefore, it can provide improved life performance.

On the other hand, the negative electrode active materials which have a higher Li– insertion/extraction potential than carbonaceous materials have been developed. Among these materials, lithium titanate having a spinel structure has such an advantage that it has excellent cycle performances and high safety because it is free from variation in volume during charge/discharge reactions.

Then battery which uses lithium iron phosphate having an olivine structure as the positive electrode active material and lithium titanate having a spinel structure as the negative electrode active material has been proposed. Such a battery has been expected to have excellent cycle performances. However, the battery having the above structure has the problem that it is difficult to detect the state of discharge based on battery voltage because a variation in battery voltage during discharging is small.

DETAILED DESCRIPTION

In general, according to one embodiment, a nonaqueous electrolyte battery is provided. The battery comprises a positive electrode, a negative electrode, and a nonaqueous electrolyte. The positive electrode comprises a positive electrode active material. The negative electrode comprises a negative electrode active material. The nonaqueous electrolyte comprises an organic solvent. The positive electrode active material comprises lithium iron phosphate having an olivine structure. The negative electrode active material comprises lithium titanate having a spinel structure and a monoclinic β-type titanium complex oxide. The organic solvent comprises a chain ether.

First Embodiment

Figure 6:
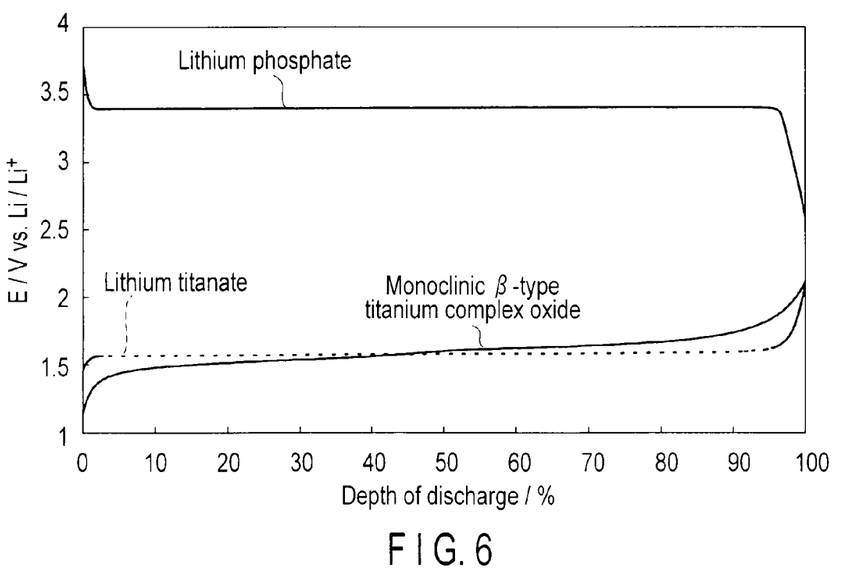
FIG. 6 is a discharge curves of lithium iron phosphate, lithium titanate and a monoclinic β-type titanium complex oxide.

FIG. 6 shows typical discharge curves of electrodes using lithium iron phosphate having an olivine structure or lithium titanate having a spinel structure. As shown in FIG. 6, both of the discharge curves of electrodes are plateau-shaped except for the vicinities of depths of discharge of 0% and 100%. Here, a depth of discharge of 100% means the state of each electrode discharged until theoretical capacity of active material is fully consumed whereas a depth of discharge of 0% means the state of each electrode fully charged up to the theoretical capacity of active material.

Battery voltage is a potential difference between the positive electrode and negative electrode. So it is understood that a battery using lithium iron phosphate having an olivine structure as the positive electrode active material and lithium titanate having a spinel structure as the negative electrode active material has a constant battery voltage at almost all depths of discharge. Because the battery voltage hardly vary during discharging, it is difficult to detect the depth of discharge based on the battery voltage. Here, a depth of discharge of 100% means the state of a battery discharged until its design capacity is fully consumed whereas a depth of discharge of 0% means the state of a battery fully charged up to the design capacity.

The battery voltage is preferably changed depending on the depth of discharge to detect the discharge state of a battery. That is to say, it is preferably that a discharge curve as shown in FIG. 6 is not plateau-shaped but has a gradient.

Then, in the embodiment, negative electrode active material comprising monoclinic β-type titanium complex oxide together with lithium titanate having a spinel structure is used. The monoclinic β-type titanium complex oxide has a lithium ion-insertion/extraction potential close to 1.5 V (vs. Li/Li+) and also, as shown in FIG. 6, has a discharge curve varied depending on the depth of discharge. Therefore, in the battery using the negative electrode active material according the embodiment, battery voltage vary depending on the depth of discharge, enabling easy detection of discharge state.

However, the monoclinic β-type titanium complex oxide has such properties that it has a high theoretical capacity while it is inferior in cycle and output performances to lithium titanate. Then, if the negative electrode active material comprises monoclinic β-type titanium complex oxide besides lithium titanate having a spinel structure, the cycle and output performances of the battery is deteriorated.

However, the inventors have succeeded in improving the cycle and output performances of a nonaqueous electrolyte battery using the above combination of positive and negative electrode active materials by using an organic solvent comprising a chain ether as the solvent for the nonaqueous electrolyte.

The first embodiment will be explained in more detail with reference to the drawings. The same reference numeral is attached to a structure common to the embodiments and duplicated explanations are omitted here. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

In the embodiment, a nonaqueous electrolyte battery comprises a positive electrode comprising a positive electrode active material, a negative electrode comprising a negative electrode active material, and a nonaqueous electrolyte comprising an organic solvent. The positive electrode active material comprises lithium iron phosphate having an olivine structure. The negative electrode active material comprises lithium titanate having a spinel structure and a monoclinic β-type titanium complex oxide. The organic solvent comprises a chain ether.

Hereinafter, the positive electrode, negative electrode, nonaqueous electrolyte, separator, and container will be explained in detail.

1) Positive Electrode

The positive electrode comprises a current collector and a positive electrode layer (namely, a positive electrode active material-containing layer). The positive electrode layer is formed on one or both surfaces of the current collector and comprises an active material, a conductive agent, and a binder.

Lithium iron phosphate having an olivine structure is used as the positive electrode active material. The lithium iron phosphate may be represented by formula $Li_{1-x}FePO_4$, where x is a value varied between 0 to 1 corresponding to the charge/discharge of the battery. Lithium iron phosphate used in the embodiment may contain impurities, for example, elements such as Mg, Al, Ti, Zr, Nb, W, Mn, Ni and Co. Here, the impurities are intended to mean components contained in an amount of 3% by mass or less when measured by the induction coupling plasma (ICP) emission spectral analysis method.

The positive electrode active material may comprise further compounds, but the compounds are preferably contained in an amount of 15% by mass or less based on the total mass of the positive electrode active material. The compounds which may be contained in active material preferably have a lithium ion-insertion/extraction potential of 3.5 V (vs. Li/Li+) or less. Examples of the compounds include $Li_2FeSiO_4$ and $Li_3Fe_2(PO_4)_3$.

The specific surface area of the positive electrode active material is preferably 1 $m^2/g$ to 50 $m^2/g$. When the specific surface area is 1 $m^2/g$ or more, lithium ion insertion/extraction sites can be sufficiently secured. When the specific surface area is 50 $m^2/g$ or less, these materials are easily handled during the industrial manufacturing processes and make it easy to produce an electrode, and provide good charge/discharge cycle performances.

The conductive agent can improve the current-collecting performance and also has the ability to limit the contact resistance of the active material with the current collector. Examples of the conductive agent include carbonaceous materials such as acetylene black, carbon black, graphite, carbon nano-fiber and carbon nano-tube.

The binder serves to bind the active material, conductive agent and current collector. Examples of the binder include a polytetrafluoroethylene (PTFE), polyvinylidene fluoride (PVdF) and fluoro-rubber.

The active material, conductive agent and binder in the positive electrode layer are preferably formulated in the ratio of 80% by mass to 95% by mass, 3% by mass to 18% by mass and 2% by mass to 17% by mass, respectively. The conductive agent can produce the aforementioned effect by blending it in an amount of 3% by mass or more. The decomposition of the nonaqueous electrolyte on the surface of the conductive agent can be reduced when the nonaqueous electrolyte is stored at high temperatures, by blending it in an amount of 18% by mass or less. When the binder is formulated in an amount of 2% by mass or more, sufficient electrode strength can be obtained. When the binder is formulated in an amount of 17% by mass or less, the amount of an insulating material in the positive electrode can be reduced, making it possible to reduce the internal resistance.

The current collector is preferably made of an aluminum foil or an aluminum alloy foil containing one or more elements selected from Mg, Ti, Zn, Mn, Fe, Cu and Si.

The positive electrode can be manufactured by suspending, for example, the active material, conductive agent and binder in a proper solvent to prepare slurry, by applying this slurry to the surface of the current collector and by drying the slurry, followed by pressing. The positive electrode may also be manufactured by forming a pellet comprising the active material, conductive agent and binder to produce a positive electrode layer, and by setting it on the current collector.

2) Negative Electrode

The negative electrode comprises a current collector and a negative electrode layer (namely, a negative electrode active material-containing layer). The negative electrode layer is formed on one or both surfaces of the current collector and comprises an active material, a conductive agent and a binder.

The negative electrode active material comprises a lithium titanate having a spinel structure and a monoclinic β-type titanium complex oxide.

The lithium titanate having a spinel structure may be represented by formula $Li_{4+x}Ti_5O_{12}$, wherein $0 \leq x \leq 3$.

The specific surface area of lithium titanate having a spinel structure is preferably 3 $m^2/g$ to 50 $m^2/g$. When the specific surface area is 3 $m^2/g$ or more, excellent output performances are obtained. When the specific surface area is 50 $m^2/g$ or less, these materials are easily handled during the industrial manufacturing processes and make it easy to produce an electrode. The specific surface area is more preferably 5 $m^2/g$ to 30 $m^2/g$.

The monoclinic β-type titanium complex oxide is a titanium complex oxide having a crystal structure belonging primarily to the space group C2/m and having a tunnel structure. In the embodiment, the monoclinic β-type titanium complex oxide is also referred to as $TiO_2(B)$. The detailed crystal structure of $TiO_2(B)$ is described in R. Marchand, L. Brohan, M. Tournoux, Material Research Bulletin 15, 1129 (1980).

The specific surface area of $TiO_2(B)$ is preferably 5 $m^2/g$ to 100 $m^2/g$. When the specific surface area is 5 $m^2/g$ or more, lithium ion-insertion/extraction sites can be secured sufficiently, so that a sufficient reversible capacity is obtained. When the specific surface area is 100 $m^2/g$ or less, satisfactory coulomb efficiency is obtained during charge/discharge.

The negative electrode active material may comprise further titanium-containing oxides such as lithium titanate having ramsdellite structure, but the titanium-containing oxides are preferably contained in an amount of 10% by mass or less based on the total mass of the negative electrode active material.

The negative electrode using a negative electrode active material comprising $TiO_2(B)$ together with lithium titanate having a spinel structure has the discharge curve varied depending on the depth of discharge. As a result, in a battery using lithium phosphate as the positive electrode active material, the discharge curve of a battery can be varied depending on the depth of discharge. Therefore, the discharge state of the battery can be easily detected based on battery voltage.

The negative electrode active material comprises $TiO_2(B)$ preferably in a range from 10% by mass to 30% by mass based on the total mass of the negative electrode active material. When 10% by mass or more of $TiO_2(B)$ is contained, it is possible to grasp the state of discharge easily. When the content of $TiO_2(B)$ is limited to 30% by mass or less, deteriorations in the cycle and output performances of the battery can be limited.

The conductive agent improves the current-collecting performance and also has the ability to limit the contact resistance of the active material with the current collector. Examples of the conductive agent include acetylene black, carbon black, graphite, carbon nano-fiber and carbon nanotube.

The binder serves to bind the active material, conductive agent and current collector. Examples of the binder include a polytetrafluoroethylene (PTFE), polyvinylidene fluoride (PVdF), fluoro-rubber, and styrene-butadiene rubber.

The active material, conductive agent and binder in the negative electrode layer are preferably formulated in the ratio of 70% by mass to 96% by mass, 2% by mass to 28% by mass and 2% by mass to 28% by mass, respectively. When the amount of the conductive agent is 2% by mass or less, the current collecting performance of the negative electrode layer can be improved. When the amount of the binder is 2% by mass or more, the binding ability of the negative electrode layer with the current collector can be improved. When each amount of the conductive agent and binder is limited to 28% by mass or less, the capacity of battery is improved.

It is desirable that the current collector is electrochemically stable in a potential range higher than 1.0 V. The current collector is preferably made of an aluminum foil or an aluminum alloy foil containing one or more elements selected from Mg, Ti, Zn, Mn, Fe, Cu and Si.

The negative electrode can be manufactured by suspending, for example, the active material, conductive agent and binder in a proper solvent to prepare slurry, by applying this slurry to the surface of the current collector and by drying the slurry, followed by pressing. The negative electrode may also be manufactured by forming a pellet comprising the active material, conductive agent and binder to produce a positive electrode layer, and by setting it on the current collector.

<Measuring Method>

Whether $TiO_2(B)$ is contained or not in the negative electrode active material can be confirmed by, for example, powder X-ray diffraction measurement.

The powder X-ray diffraction measurement of the active material can be made in the following manner.

First, an target sample is filled in a holder part which is formed on a glass sample plate and has a depth of 0.2 mm. At this time, much care is necessary to fill the holder part fully with the sample. Further, special care should be taken to avoid cracking and formation of voids caused by insufficient filling of the sample.

Then, a separate glass plate is used to smooth the surface of the sample by sufficiently pressing the separate glass plate against the sample. Much care should be taken to avoid too mach or too little amount of the sample to be filled, thereby preventing any rise and dent from the basic plane of the glass holder.

Then, the glass plate filled with the sample is mounted on the powder X-ray diffractometer, and a diffraction pattern is obtained using Cu—Kα radiation source.

Although some of the samples have weak peak intensities in the powder XRD pattern due to the low crystallinity of $TiO_2(B)$, which makes identifying individual peak intensities difficult, it is only required to observe a peak derived from monoclinic type titanium dioxide belonging to the space group C2/m.

The content of $TiO_2(B)$ in the negative electrode active material can be found by powder XRD measurement and ICP measurement. First, it is confirmed from the results of powder XRD measurement that only peaks derived from $Li_4Ti_5O_{12}$ and $TiO_2(B)$ are observed. When a third active material other than the above two materials is contained, its phase is identified. Thereafter, the ratio of Li/Ti is analyzed from the results of ICP measurement to find the content of each of $Li_4Ti_5O_{12}$ and $TiO_2(B)$. When a third active material is contained, it is necessary to take the atom constituting the active material into account. Further, in the results of XRD measurement, the ratio of the peak intensity of $Li_4Ti_5O_{12}$ to that of $TiO_2(B)$ also serves as a reference to find each content.

When powder X-ray diffraction measurement carry out regarding the active material contained in the electrode, the measurement may be performed in the following manner. The electrode is sticked to a glass sample plate and then the glass is set to a powder X-ray diffractometer. Then, a diffraction pattern is obtained using Cu—Kα radiation source. Alternatively, the electrode may be peeled from the current collector and milled to obtain sample. The sample is filled in a 0.2 mm-deep holder part formed on the glass sample plate. Then, diffraction pattern is obtained according to the above method.

3) Nonaqueous Electrolyte

Examples of the nonaqueous electrolyte include a liquid nonaqueous electrolyte. The liquid nonaqueous electrolyte is prepared by dissolving an electrolyte in an organic solvent.

The organic solvent contains a chain ether. The chain ether has a low viscosity and a high conductivity. Therefore the use of a chain ether in the organic solvent enables improvements in the output performances and large-current performances of the battery. Further, the use of a chain ether makes it possible to recover the cycle performances which are deteriorated by formulating $TiO_2(B)$.

Because the chain ether is easily oxidized and decomposed, it is undesirable to use it in a nonaqueous electrolyte battery using a positive electrode comprising an active material which has a high lithium ion-insertion/extraction potential such as lithium-cobalt complex oxide. However, in the embodiment, the lithium ion-insertion/extraction potential of the positive electrode is as low as about 3.4 V since the lithium iron phosphate compound having an olivine structure is used as the positive electrode active material. Therefore, the chain ether may be used as the organic solvent in the battery according to the embodiment.

Further, in a nonaqueous electrolyte battery using a carbonaceous material as the negative electrode active material, if an ether compound is contained, it is known that the surface of the carbonaceous material is peeled off, bringing about deteriorated charge/discharge performances. In the embodiment, however, lithium titanate having a spinel structure and $TiO_2(B)$ are used as the negative electrode active material. Therefore, it is possible to contain a chain ether in the liquid nonaqueous electrolyte.

The chain ether is preferably selected from compounds represented by $R^1O(CH_2)_{1-2}OR^2$. In the formula, $R^1$ and $R^2$ are independently selected from a methyl group and an ethyl group. Examples of the chain ether include dimethoxymethane (DMM), dimethoxyethane (DME), diethoxymethane (DEM), diethoxyethane (DEE), ethoxymethoxymethane (EMM) and ethoxymethoxyethane (EME). Particularly, it is preferable to use a chain ether selected from DME and DEE. Because DME and DEE have a low melting point, they have a low viscosity and a high conductivity even at low temperatures. Therefore, the low-temperature performances of the battery can be improved by using DME or DEE as the organic solvent.

The organic solvent is preferably further comprises a cyclic carbonate. The cyclic carbonate has a high permittivity and tends to dissolve a lithium salt. Thus, the output and cycle performances of the battery can be further improved by containing appropriate amount of the cyclic carbonate in addition to the chain ether.

Examples of the cyclic carbonate include propylene carbonate (PC) and ethylene carbonate (EC).

When the organic solvent comprises the chain ether and cyclic carbonate, the chain ether is preferably contained in the range of 5% by volume to 70% by volume, and the cyclic carbonate is preferably contained in the range of 30% by volume to 95% by volume, based on the volume of the organic solvent.

When the cyclic carbonate is contained in an amount of 30% by volume or more, a lithium salt can be sufficiently dissolved and therefore, high battery performances are obtained. When the cyclic carbonate is contained in an amount of 95% by volume or less, the viscosity is not greatly increased but the effect of the chain ether improving the battery performances is obtained.

The ratio by volume of the chain ether to cyclic carbonate can be measured by, for example, H-NMR measurement.

The organic solvent may further contain a cyclic ether, a chain carbonate and the like. Examples of the cyclic ether include tetrahydrofuran (THF), 2-methyltetrahydrofuran (2MeTHF), 1,3-dioxoran (DOL) and 1,4-dioxane (DOX).

Examples of the chain carbonate include diethyl carbonate (DEC), dimethyl carbonate (DMC) and methylethyl carbonate (MEC).

Further, the organic solvent may contain a compound such as γ-butyrolactone (GBL), acetonitrile (AN) and sulfolane (SL).

When other compounds are contained in the organic solvent, the total volume of the chain ether and cyclic carbonate is preferably 60% or more based on the total volume of the organic solvent.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], and bispentafluoroethylsulfonylimide lithium [$LiN(C_2F_5SO_2)_2$], or mixtures of these compounds.

As the electrolyte, a lithium salt having an imide anion is preferably used and $LiN(CF_3SO_2)_2$ or $LiN(C_2F_5SO_2)_2$ is more preferably used.

A lithium salt having an imide anion is scarcely decomposed even if $TiO_2(B)$ is contained in the negative electrode, so that a coating film is scarcely generated on the negative electrode. Therefore, the battery using such a salt has an advantage that the cycle performance is improved.

A lithium salt having an imide anion cannot be used in a battery using the positive electrode active material having a lithium ion-insertion/extraction potential of, for example, about 4 V (vs. $Li/Li^+$), because it corrodes the aluminum used for the current collector. In the embodiment, however, lithium iron phosphate having an olivine structure is used as the positive electrode active material and therefore, the lithium ion-insertion/extraction potential of the positive electrode is as low as about 3.4 V. Therefore, a lithium salt having an imide anion can be used.

The concentration of the electrolyte in the liquid nonaqueous electrolyte is preferably in a range from 0.5 mol/l to 2.5 mol/l.

4) Separator

The separator may be formed of, porous films containing, for example, a polyethylene, polypropylene, cellulose or polyvinylidene fluoride (PVdF) or nonwoven fabrics made of synthetic resins. Porous films formed of a polyethylene or polypropylene is preferably used. These porous films can melt at a fixed temperature to cut off current and can therefore improve safety.

5) Container

A container made of a laminate film 0.5 mm or less in thickness or a metal container may be used. The metal container may have a thickness 0.5 mm or less, preferably 0.2 mm or less.

Examples of the shape of the container include a flat type (thin type), angular type, cylinder type, coin type and button type. As the container, an appropriate one may be selected corresponding to the dimension of the battery. Containers for miniature batteries to be mounted in, for example, mobile electronic devices or package materials for large batteries to be mounted on two-wheel or four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as a polypropylene (PP), polyethylene (PE), nylon and polyethylene terephthalate (PET) may be used for the resin layer. The laminate film can be molded into a desired shape by sealing through thermal fusion.

The metal container is made of aluminum, an aluminum alloy or the like. The aluminum alloy is preferably an alloy comprising one or more elements selected from magnesium, zinc, and silicon. When the alloy comprises transition metals such as iron, copper, nickel and chromium, the amount of the transition metals is preferably 100 ppm by mass or less.

6) Nonaqueous Electrolyte Battery

Figure 1:
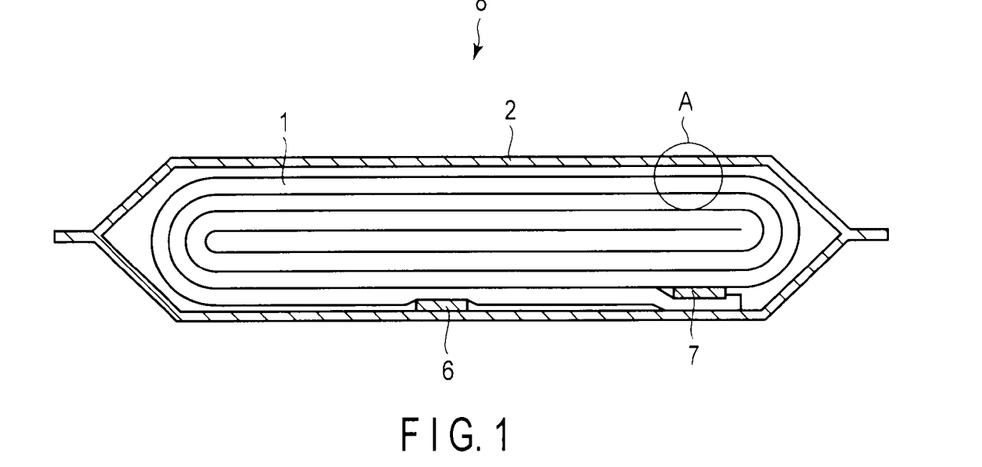
FIG. 1 is a sectional view of a thin-type nonaqueous electrolyte battery according to a first embodiment.
Figure 2:
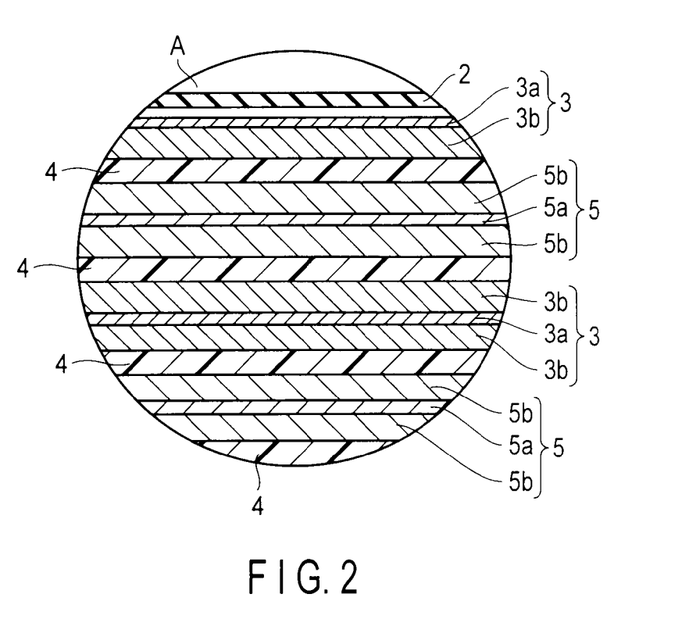
FIG. 2 is an enlarged sectional view of the A part of FIG. 1.

Next, as an example of the nonaqueous electrolyte battery according to the embodiment, a thin-type nonaqueous electrolyte battery provided with a container made of a laminate film will be explained. FIG. 1 is a typical sectional view of the thin-type nonaqueous electrolyte battery 8 and FIG. 2 is an enlarged sectional view of the part A shown in FIG. 1. Each of these drawings is a typical view to aid in understanding the embodiment. Though there are parts different from an actual battery in shape, dimension and ratio, these structural designs may be properly changed taking the following explanations and known technologies into consideration.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate. The outermost negative electrode 3 has a structure in which as shown in FIG. 2, a negative electrode layer 3b is formed on one of the inside surfaces of a negative electrode current collector 3a. Other negative electrodes 3 each have a structure in which a negative electrode layer 3b is formed on each surface of the negative electrode current collector 3a.

The active material in the negative electrode layer 3b comprises lithium titanate having a spinel structure and monoclinic β-type titanium complex oxide.

In the positive electrode 5, a positive electrode layer 5b is formed on each surface of a positive electrode current collector 5a.

The active material in the positive electrode layer 5b comprises lithium iron phosphate having an olivine structure.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. These negative electrode terminal 6 and positive electrode terminal 7 are externally extended from an opening part of the baggy container 2. A liquid nonaqueous electrolyte is, for example, injected from the opening part of the baggy package material 2. The opening part of the baggy package material 2 is closed by heat sealing with the negative electrode terminal 6 and positive electrode terminal 7 extended out of the opening part to thereby seal the coil electrode group 1 and liquid nonaqueous electrolyte.

The negative electrode terminal 6 is made of, for example, a material having electric stability and conductivity in a potential range from 1 V to 3 V with respect to a lithium ion metal. Examples of the material for the negative electrode terminal include aluminum and aluminum alloys containing one or more elements selected from Mg, Ti, Zn, Mn, Fe, Cu and Si. The negative electrode terminal 6 is preferably made of the same material as the negative electrode current collector 3a to reduce the contact resistance with the negative electrode current collector 3a.

The positive electrode terminal 7 is made of, for example, a material having electric stability and conductivity in a potential range from 3 V to 4.5 V with respect to a lithium ion metal. Examples of the material for the positive electrode terminal include aluminum and aluminum alloys containing one or more elements selected from Mg, Ti, Zn, Mn, Fe, Cu and Si. The positive electrode terminal 7 is preferably made of the same material as the positive electrode current collector 5a to reduce the contact resistance with the positive electrode current collector 5a.

Although a flat type nonaqueous electrolyte secondary battery is explained in the above embodiment, the battery shape may be any of a flat type, angular type, cylinder type, coin type, button type, sheet type, laminate type and the like. Further, the battery may be a small battery mounted in, for example, a mobile electronic device or a large battery mounted on two-wheel to four-wheel vehicles.

According to the above embodiment, a nonaqueous electrolyte battery can be provided which ensures that the state of discharge is easily detected and which has excellent cycle performances and output performances.

Second Embodiment

Next, a battery pack according to a second embodiment will be explained with reference to the drawings. The battery pack comprises one or more of the nonaqueous electrolyte batteries (unit cells) according to the above first embodiment. When the battery pack includes two or more unit cells, these unit cells are disposed in such a manner that they are electrically connected in series or in parallel.

Figure 3:
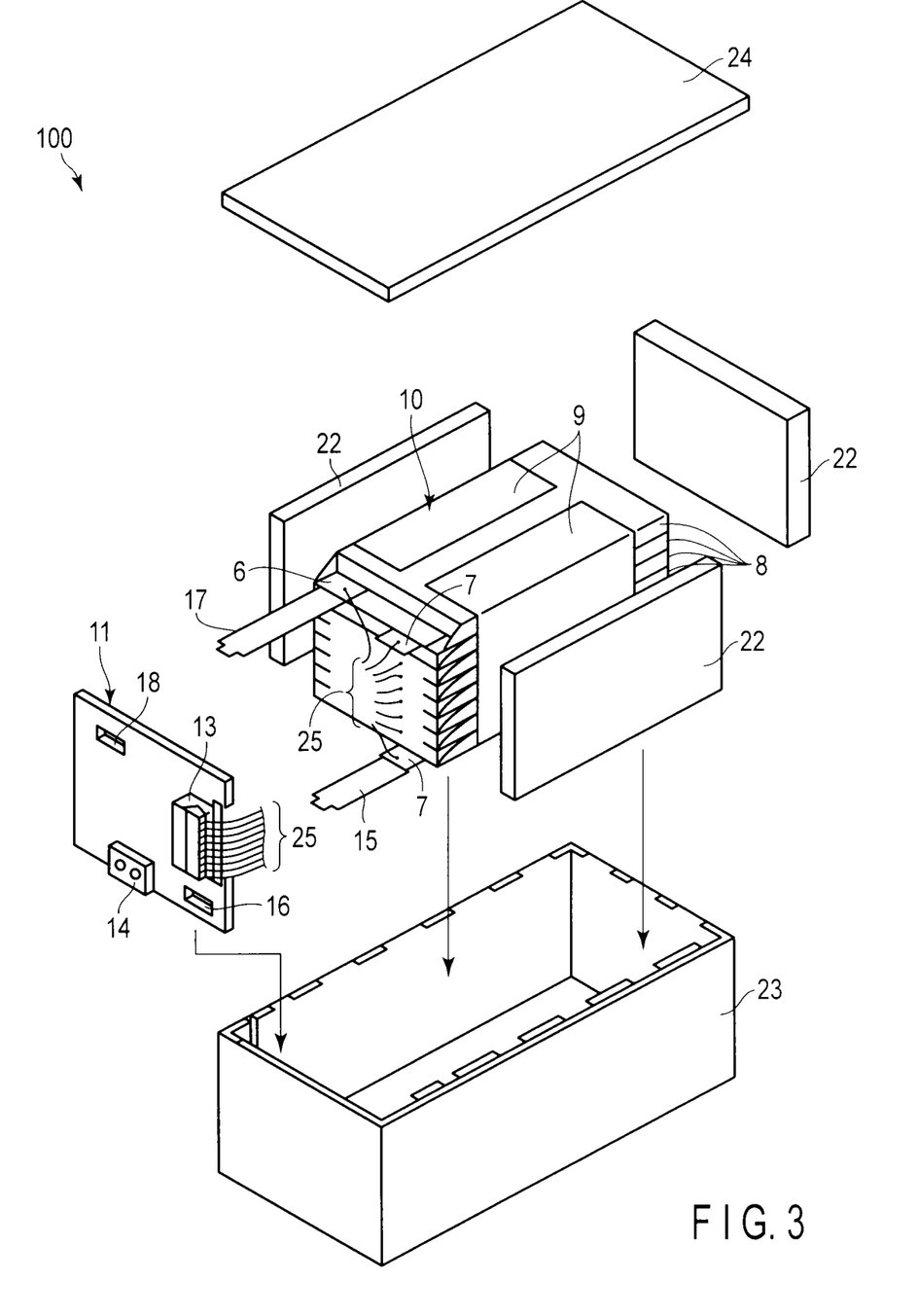
FIG. 3 is an exploded perspective view of a battery pack according to a second embodiment.
Figure 4:
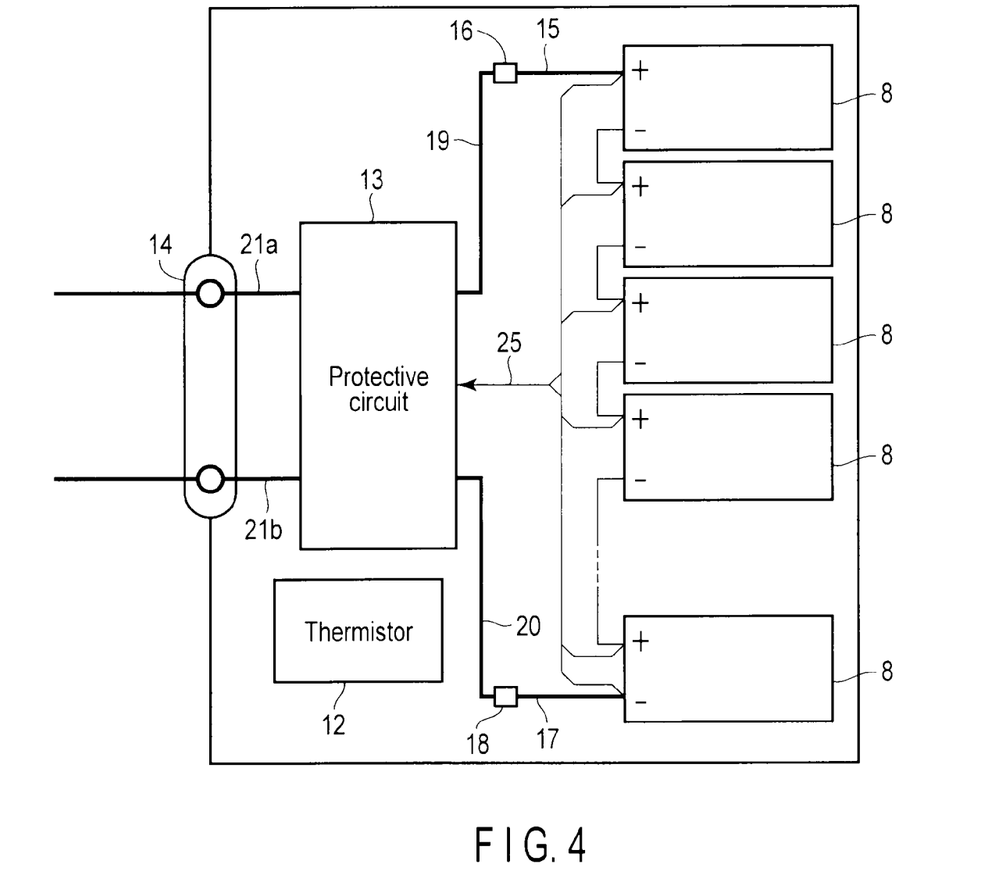
FIG. 4 is a block diagram showing the electric circuit of a battery pack of FIG. 3.

FIGS. 3 and 4 show an example of a battery pack 100 comprising two or more flat-type unit cells 8. FIG. 3 is an exploded perspective view of the battery pack 100. FIG. 4 is a block diagram showing an electric circuit of the battery pack shown in FIG. 3.

A plurality of unit cells 8 are laminated such that the externally extended negative electrode terminals 6 and positive electrode terminals 7 are arranged in the same direction and fastened with an adhesive tape 9 to thereby configure a battery module 10. These unit cells 8 are electrically connected in series as shown in FIG. 4.

A printed wiring board 11 is disposed opposite to the side surface of the unit cell 8 from which the negative electrode terminal 6 and positive electrode terminal 7 are extended. As shown in FIG. 4, a thermistor 12, a protective circuit 13 and an energizing terminal 14 connected to external devices are mounted on the printed wiring board 11. An insulating plate (not shown) is attached to the surface of the printed wiring board 11 facing the battery module 10 to avoid unnecessary electrical connection with the wiring of the battery module 10.

A positive electrode side lead 15 is connected with the positive electrode terminal 7 positioned on the lowermost layer of the battery module 10 with its tip being inserted into a positive electrode side connector 16 of the printed wiring board 11 for electrical connection. A negative electrode side lead 17 is connected with the negative electrode terminal 6 positioned on the uppermost layer of the battery module 10 with its tip being inserted into a negative electrode side connector 18 of the printed wiring board 11 for electrical connection. These connectors 16 and 18 are connected to a protective circuit 13 through wirings 19 and 20 formed on the printed wiring board 11.

The thermistor 12 is used to detect the temperature of the unit cell 8 and the detected signals are transmitted to the protective circuit 13.

The protective circuit 13 can shut off a plus side wiring 21a and minus side wiring 21b between the protective circuit 13 and the energizing terminal 14 connected to external devices in a predetermined condition. The predetermined condition means, for example, the case where the temperature detected by the thermistor 12 is a predetermined one or higher. Further, the predetermined condition means, for example, the case of detecting overcharge, overdischarge and over-current of the unit cell 8. The detections of this overcharge and the like are made for individual unit cells 8 or whole unit cells 8. When individual unit cells 8 are detected, either the voltage of the battery may be detected or the potential of the positive electrode or negative electrode may be detected. In the latter case, a lithium electrode used as a reference electrode is inserted between individual unit cells 8. In the case of FIGS. 3 and 4, a wiring 25 for detecting voltage is connected to each unit cell 8 and the detected signals are transmitted to the protective circuit 13 through these wirings 25.

A protective sheet 22 made of a rubber or resin is disposed on each of the three side surfaces of the battery module 10 excluding the side surface from which the positive electrode terminal 7 and negative electrode terminal 6 are projected.

The battery module 10 is accommodated in a receiving container 23 together with each protective sheet 22 and printed wiring board 11. Specifically, the protective sheet 22 is disposed on each inside surface in the direction of the long side and on one of the inside surfaces in the direction of the short side of the receiving container 23, and the printed wiring board 11 is disposed on the other inside surface in the direction of the short side. The battery module 10 is positioned in a space enclosed by the protective sheet 22 and the printed wiring board 11. A lid 24 is attached to the upper surface of the receiving container 23.

Here, a thermally contracting tape may be used in place of the adhesive tape 9 to secure the battery module 10. In this case, after the protective sheet is disposed on both sides of the battery module and the thermally contracting tapes are wound around the battery module; the thermally contracting tape is contracted by heating to fasten the battery module.

The structure in which the unit cells 8 are connected in series is shown in FIGS. 3 and 4. However, with regard to these unit cells 8, either series or series-parallel cell connections may be used to increase the capacity of the battery. The assembled battery packs may be further connected in series or parallel.

Further, the structure of the battery pack is appropriately changed according to its use. The battery pack is preferably used in applications exhibiting excellent cycle performance when a large current is extracted. Specific examples of these applications include power sources for digital cameras, and power sources mounted on vehicles such as two- to four-wheel vehicles, hybrid electric cars, two- to four-wheel electric cars and assist bicycles. The battery pack is preferably used for power sources mounted on vehicles.

According to the above embodiment, a battery pack can be provided which ensures that the state of discharge is easily detected and which has excellent cycle and output performances.

EXAMPLES

The embodiment will be explained in more detail by way of Examples, but they are not intended to limit the embodiment.

Example 1

90% by mass of lithium iron phosphate (LiFePO$_4$) as the positive electrode active material, 3% by mass of acetylene black, 3% by mass of cokes and 4% by mass of PVdF were dissolved in NMP to manufacture a positive electrode slurry. This slurry was applied to both surfaces of an aluminum foil which was a current collector, and then dried to obtain a positive electrode.

92% by mass of a mixture of lithium titanate (Li$_4$Ti$_5$O$_{12}$) and TiO$_2$(B) as the negative electrode active material, 3% by mass of acetylene black, 3% by mass of cokes and 2% by mass of PVdF were dissolved in NMP to manufacture a negative electrode slurry. This slurry was applied to both surfaces of an aluminum foil which was a current collector, and then dried to obtain a negative electrode. The ratio by mass of lithium titanate and TiO$_2$(B) was as follows: Li$_4$Ti$_5$O$_{12}$:TiO$_2$(B)=80:20.

A mixed solvent was prepared by blending diethoxyethane (DEE) with propylene carbonate (PC) in a ratio by volume of 2:1. LiN(CF$_3$SO$_2$)$_2$ was dissolved as the electrolyte in the mixed solvent at a concentration of 1.0 mol/L to obtain an electrolytic solution.

An evaluation cell was manufactured by using the produced positive electrode and negative electrode and a glass filter as the separator. The process was carried out in an atmosphere of dry argon. The positive electrode and the negative electrode were made to face each other with the glass filter being interposed therebetween and put into a bipolar glass cell. The positive electrode and negative electrode were respectively connected to a terminal of the glass cell, and an electrolytic solution was poured into the glass cell. Then, the glass container was sealed in the condition that the separator and the electrodes were sufficiently impregnated with the electrolytic solution.

Example 2

An evaluation cell was manufactured in the same manner as in Example 1 except that the ratio by mass of lithium titanate and TiO$_2$(B) was as follows: Li$_4$Ti$_5$O$_{12}$:TiO$_2$(B)=90:10.

Example 3

An evaluation cell was manufactured in the same manner as in Example 1 except that the ratio by mass of lithium titanate and TiO$_2$(B) which were the negative electrode active materials was as follows: Li$_4$Ti$_5$O$_{12}$:TiO$_2$(B)=70:30.

Example 4

An evaluation cell was manufactured in the same manner as in Example 1 except that the ratio by mass of lithium titanate and TiO$_2$(B) was as follows: Li$_4$Ti$_5$O$_{12}$:TiO$_2$(B)=95:5.

Example 5

An evaluation cell was manufactured in the same manner as in Example 1 except that the ratio by mass of lithium titanate and TiO$_2$(B) was as follows: Li$_4$Ti$_5$O$_{12}$:TiO$_2$(B)=65:35.

Example 6

An evaluation cell was manufactured in the same manner as in Example 1 except that 1.0 mol/L of LiPF$_6$ was used as the electrolyte in the electrolytic solution.

Example 7

An evaluation cell was manufactured in the same manner as in Example 1 except that the mixed solvent was prepared by mixing dimethoxyethane (DME) and propylene carbonate (PC) in a ratio by volume of 2:1.

Example 8

An evaluation cell was manufactured in the same manner as in Example 1 except that the mixed solvent was prepared by mixing dimethoxyethane (DME) and propylene carbonate (PC) in a ratio by volume of 1:1.

Example 9

An evaluation cell was manufactured in the same manner as in Example 1 except that the mixed solvent was prepared by mixing dimethoxyethane (DME) and propylene carbonate (PC) in a ratio by volume of 1:2.

Example 10

An evaluation cell was manufactured in the same manner as in Example 1 except that the mixed solvent was prepared by mixing ethoxymethoxyethane (EME) and propylene carbonate (PC) in a ratio by volume of 2:1.

Comparative Example 1

An evaluation cell was manufactured in the same manner as in Example 1 except that only lithium titanate was used as the negative electrode active material.

Comparative Example 2

An evaluation cell was manufactured in the same manner as in Example 1 except that the mixed solvent was prepared by mixing propylene carbonate (PC) and diethyl carbonate (DEC) in a ratio by volume of 2:1, and $LiPF_6$ was dissolved as the electrolyte in the mixed solvent at a concentration of 1.0 mol/L.

Comparative Example 3

An evaluation cell was manufactured in the same manner as in Example 1 except that the mixed solvent was prepared by mixing propylene carbonate (PC) and diethyl carbonate (DEC) in a ratio by volume of 2:1, and $LiN(CF_3SO_2)_2$ was dissolved as the electrolyte in the mixed solvent at a concentration of 1.0 mol/L.

(Charge/Discharge Test)

A charge/discharge test was performed at 25° C. using the produced evaluation cells in the condition of a charge/discharge rate of 0.1 C, a voltage range from 1.0 to 2.4 V. The voltage of pseudo open circuit of the cell can be grasped by charging and discharging at a rate as low as about 0.1 C. A variation in cell voltage depending on the state of discharge was observed based on the results of the charge/discharge test.

Further, a test for study of cycle performance was performed at 25° C. in the condition of a charge/discharge rate of 1 C, a voltage range from 1.0 to 2.4 V. The capacity retention ratio after 20 cycles was calculated from the result.

(Test Results)

Figure 5:
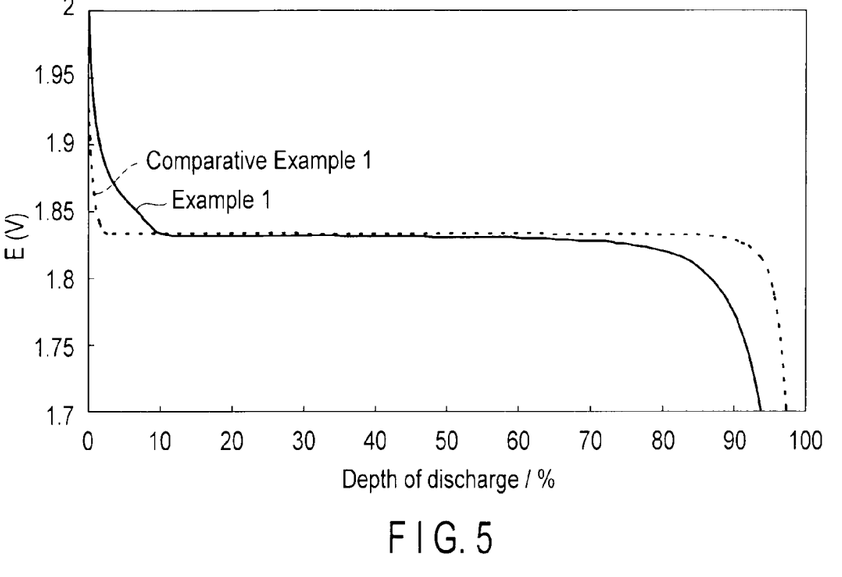
FIG. 5 is a discharge curves of evaluation cells of Example 1 and Comparative Example 1.

The discharge curves of Example 1 and Comparative Example 1 are shown in FIG. 5. It is found from FIG. 5 that no potential gradient is observed at almost all depths of discharge in the discharge curve of Comparative Example 1. In the discharge curve of Example 1 in which 20% by mass of $TiO_2(B)$ was contained in the negative electrode active material, a potential gradient was observed in the initial and end periods of discharge step. A large potential gradient was observed particularly at a depth of discharge range from 0 to 10% and at a depth of discharge range from 90 to 100%, showing that the state of discharge could be clearly detected.

It was confirmed from the above results that a nonaqueous electrolyte secondary battery using lithium iron phosphate as the positive electrode active material and lithium titanate and $TiO_2(B)$ as the negative electrode active material ensured easy detection of the state of discharge from battery voltage.

The capacity retention ratio (%) after 20 cycles and the ratio by mass of $Li_4Ti_5O_{12}$ and $TiO_2(B)$ in each of Examples 1 to 5 are shown in Table 1. It was confirmed that the capacity retention ratio was decreased with increase in the amount of $TiO_2(B)$. However, it is preferable that a larger amount of $TiO_2(B)$ be contained to detect voltage easily. It is considered that $TiO_2(B)$ is preferably contained in an amount of 10% by mass to 30% by mass based on the total mass of the negative electrode active material in consideration of the compatibility between the detection of voltage and cycle performances.

TABLE 1

|  | Capacity retention ratio (%) | $Li_4Ti_5O_{12}$ | $TiO_2$ (B) |
| --- | --- | --- | --- |
| Example 1 | 86 | 80 | 20 |
| Example 2 | 92 | 90 | 10 |
| Example 3 | 82 | 70 | 30 |

TABLE 1-continued

|  | Capacity retention ratio (%) | $Li_4Ti_5O_{12}$ | $TiO_2$ (B) |
| --- | --- | --- | --- |
| Example 4 | 93 | 95 | 5 |
| Example 5 | 80 | 65 | 35 |

The capacity retention ratios of Examples 6 to 10 and Comparative Examples 2 and 3 are shown in Table 2. From the result that Example 6 has a lower capacity retention ratio than Example 1, $LiN(CF_3SO_2)_2$ is more preferable as the lithium salt than $LiPF_6$ in the battery of the embodiment. The reason for this is considered to be that $LiN(CF_3SO_2)_2$ is scarcely reduced and decomposed. It was confirmed from the comparisons of Examples 7 to 9 that the capacity retention ratio was substantially the same even in the case where the ratio of a cyclic carbonate was increased.

The lithium ion conductivity of the electrolytic solution reaches a maximum when the ratio by volume of PC and DME (PC:DME) is about 1:2 and the output performance tend to be deteriorated with increase in the amount of a cyclic carbonate. It was found from the observation of the charge/discharge curve that the overvoltage during charge/discharge tended to be larger with increase in PC ratio.

TABLE 2

|  | Capacity retention ratio (%) |
| --- | --- |
| Example 6 | 80 |
| Example 7 | 87 |
| Example 8 | 83 |
| Example 9 | 80 |
| Example 10 | 84 |
| Comparative Example 2 | 69 |
| Comparative Example 3 | 75 |

It is found by comparing Examples 1, 7 and 10 with Comparative Examples 2 and 3, that the capacity retention ratio is higher in the case of using DEE, DME and EME than in the case of using DEC as the solvent in the electrolytic solution. The reason for this is that the reduction and decomposition of the solvent are more decreased in the case of using DEE, DME and EME. Also, the overvoltage during charge/discharge is smaller in the case of using DEE and DME than in the case of using DEC. Thus, it was confirmed that the cycle and output performances were improved by formulating a chain ether in the nonaqueous electrolyte.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery, comprising:
a positive electrode comprising a positive electrode active material;
a negative electrode comprising a negative electrode active material; and a nonaqueous electrolyte comprising an organic solvent;
wherein:
the positive electrode active material comprises lithium iron phosphate having an olivine structure;
the negative electrode active material comprises lithium titanate having a spinel structure and a monoclinic β-type titanium complex oxide; and
the organic solvent comprises a chain ether in the range of 5% by volume to 70% by volume and a cyclic carbonate in the range of 30% by volume to 95% by volume, based on the total volume of the organic solvent,
and wherein the negative electrode active material comprises the monoclinic β-type titanium complex oxide in the range of 10% by mass to 30% by mass based on the total mass of the negative electrode active material.

2. The battery according to claim 1, wherein the negative electrode active material comprises the monoclinic β-type titanium complex oxide in the range of 10% by mass to 20% by mass based on the total mass of the negative electrode active material.

3. The battery according to claim 1, wherein the chain ether is selected from chain ethers represented by $R^1O(CH_2)_nOR^2$ wherein n is 1 or 2, $R^1$ and $R^2$ are independently selected from a methyl group and an ethyl group.

4. The battery according to claim 1, wherein the nonaqueous electrolyte comprises a lithium salt containing an imide anion.

5. A battery pack comprising the nonaqueous electrolyte battery according claim 1.

6. The battery according to claim 1, wherein the lithium iron phosphate having an olivine structure is represented by formula $Li_{1-x}FePO_4$ (0≤x≤1).

7. The battery according to claim 1, wherein the positive electrode active material has a specific surface area in a range from 1 m²/g to 50 m²/g.

8. The battery according to claim 1, wherein the positive electrode comprises at least one positive electrode layer, the positive electrode layer containing the positive electrode active material in the range from 80% by mass to 95% by mass.

9. The battery according to claim 1, wherein the lithium titanate having a spinel structure is represented by formula $Li_{4+x}Ti_5O_{12}$ (0≤x≤3).

10. The battery according to claim 1, wherein the lithium titanate having a spinel structure has a specific surface area in the range from 3 m²/g to 50 m²/g.

11. The battery according to claim 1, wherein the monoclinic β-type titanium complex oxide has a crystal structure belonging to the space group $C^2/m$.

12. The battery according to claim 1, wherein the monoclinic β-type titanium complex oxide has a specific surface area in the range from 5 m²/g to 100 m²/g.

13. The battery according to claim 1, wherein the negative electrode comprises at least one negative electrode layer, the negative electrode layer containing the negative electrode active material in the range from 70% by mass to 96% by mass.

14. The battery according to claim 1, wherein the chain ether is at least one selected from the group consisting of dimethoxymethane (DMM), dimethoxyethane (DME), diethoxymethane (DEM), diethoxyethane (DEE), ethoxymethoxymethane (EMM) and ethoxymethoxyethane (EME).

15. The battery according to claim 14, wherein the cyclic carbonate is at least one selected from the group consisting of propylene carbonate and ethylene carbonate.

\* \* \* \* \*